United States Patent [19]

Akimoto et al.

[11] Patent Number: 4,701,800

[45] Date of Patent: Oct. 20, 1987

[54] SCANNING LINE POSITION CONTROL SYSTEM FOR SHIFTING THE POSITION OF SCANNING LINES TO IMPROVE PHOTOGRAPHIC REPRODUCTION QUALITY

[75] Inventors: Taizo Akimoto, Minamiashigara; Asaki Nagai, Tokyo, both of Japan

[73] Assignees: Fuji Photo Film Co., Ltd.; Ikegami Tsushinki Co., Ltd., both of Japan

[21] Appl. No.: 890,267

[22] Filed: Jul. 29, 1986

[30] Foreign Application Priority Data

Jul. 29, 1985 [JP] Japan ................................ 60-167294
Jul. 29, 1985 [JP] Japan ................................ 60-167295

[51] Int. Cl.⁴ ........................ H04N 5/262; H04N 5/04; H04N 7/01
[52] U.S. Cl. .................................. 358/244; 358/140; 358/148
[58] Field of Search ............... 358/183, 148, 244, 140, 358/166, 152; 340/730, 814; 315/399, 408

[56] References Cited

U.S. PATENT DOCUMENTS 3,814,855  6/1974  Kokado .................. 358/152
4,096,530  6/1978  Plugge et al. ........... 358/244
4,415,931  11/1983 Dischert ................. 358/166

*Primary Examiner*—Howard W. Britton
*Assistant Examiner*—John K. Peng
*Attorney, Agent, or Firm*—Sughrue, Mion, Zinn, Macpeak, and Seas

[57] ABSTRACT

A scanning line control system shifts the timing at which a vertical synchronizing signal is generated, by h/N, to insert (N−1) scanning lines, in appearance, during one line-to-line interval for producing accurate hard copies of images displayed on a video monitor. The scanning line control system generates a signal of a frequency Nfh in synchronism with a horizontal synchronizing signal where (N−1) is the maximum number of scanning lines inserted during one line-to-line interval and fh is the frequency of the horizontal synchronizing signal. The signal of the frequency Nfh is decoded by a logic circuit in which there is preset a value corresponding to the vertical synchronizing signal as it is frequency-divided by N. The logic circuit is decoded by a train of N pulses produced by dividing the frequency Nfh synchronous with the horizontal synchronizing signal. A vertical deflection circuit is triggered by an output from the logic circuit. The vertical synchronizing signal is therefore shifted in periods of h/N with the result that a maximum of (N−1) scanning lines can be inserted, in appearance, during one line-to-line interval. A hard copy produced by photographing an image formed at a reduced line-to-line interval has a uniform contrast.

5 Claims, 7 Drawing Figures

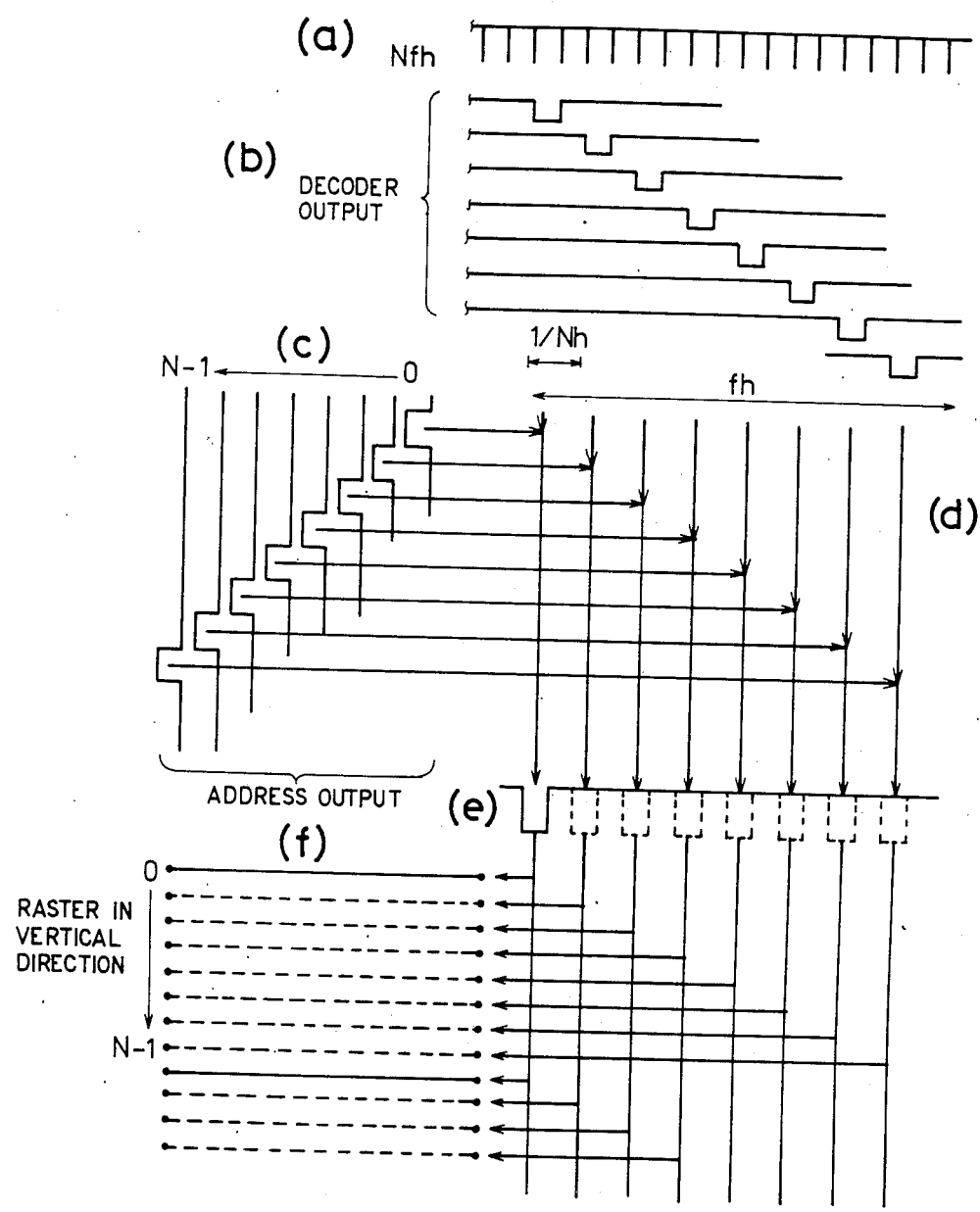

SCANNING LINE POSITION CONTROL SYSTEM FOR SHIFTING THE POSITION OF SCANNING LINES TO IMPROVE PHOTOGRAPHIC REPRODUCTION QUALITY

BACKGROUND OF THE INVENTION

The present invention relates to a scanning line position control system, and more particularly to a scanning line position control system for controlling the position of scanning lines on a CRT video monitor to produce images of as good quality as possible when such images displayed on the CRT video monitor are photographed to produce hard copies on photographic films.

For the preservation of a image displayed on a CRT video monitor, it has been practiced to photograph such a displayed image with a camera to produce a hard copy on a photographic film. Since no image is actually displayed between scanning lines on the CRT video monitor, the photographed image on the film suffers a high contrast between the scanning lines and spaces between the scanning lines, with the result that no hard copies of good quality can be produced.

Various attempts have heretofore been made to solve the aforesaid problem. One effort has been to add a small oscillating signal to a vertical synchronizing signal for a CRT video monitor. This method has been disadvantageous because it requires a high level of technique in order to add a high-frequency oscillating signal, which is small enough not to damage image information to be recorded, to the vertical synchronizing signal. According to another process, a vertical synchronizing signal is successively delayed by a monostable multivibrator. The desired delay time is set by a time-constant circuit composed of a capacitor and a resistor. However, the delay time may not be stable at all times due for example of temperature variations. Furthermore, where image signals are displayed by the interlaced scanning system, scanning lines cannot be erased if scanning lines in an even field are not accurately positioned between scanning lines in an odd field.

SUMMARY OF THE INVENTION

It is a general object of the present invention to provide a scanning line position control system of a simple arrangement which is capable of inserting, in appearance, a plurality of scanning lines in synchronism with a horizontal synchronizing signal of a composite video signal during one scanning period or one line-to-line interval, thereby enabling images displayed on a video monitor to be photographed by a camera or the like as accurate hard copies.

Another object of the present invention is to provide a scanning line position control system including signal generator means for generating a signal having a frequency Nfh in synchronism with a horizontal synchronizing signal separated from a composite video signal (fh is the frequency of the horizontal synchronizing signal), a multiplex interlace setting unit receptive of the signal from the signal generator means and a vertical synchronizing signal separated from the composite video signal, and a vertical deflection circuit triggerable by an output signal from the multiplex interlace setting unit.

Still another object of the present invention is to provide a scanning line position control system wherein the multiplex interlace setting unit comprises a modulo-N counter for counting the vertical synchronizing signal separated from the composite video signal, a preset modulo-N counter receptive of the signal from the signal generator means, and data generator means for generating data corresponding to output data from the modulo-N counter and for presetting the generated data into the preset modulo-N counter in synchronism with the vertical synchronizing signal, the arrangement being such that the preset modulo-N counter produces a carry signal to trigger the vertical deflection circuit.

A still further object of the present invention is to provide a scanning line position control system wherein the data generator means comprises a read-only memory.

A yet still further object of the present invention is to provide a scanning line position control system wherein the data generator means comprises at least one multiplexer and logic means.

Still another object of the present invention is to provide a scanning line position control system wherein the multiplex interlace setting unit comprises decoder means for decoding a pulse signal from the signal generator means into a train of N pulses, address decoder means for generating N address data from a signal synchronous with the vertical synchronizing signal, and data selector means for selecting and issuing input pulses applied to the decoder means according to an output from the address decoder means, the arrangement being such that the data selector means issues an output to trigger the vertical deflection circuit.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a waveform diagram explanatory of operation of the interlace setting unit illustrated in FIG. 6.

DESCRIPTION OF THE PREFERRED EMBODIMENT

Figure 1:
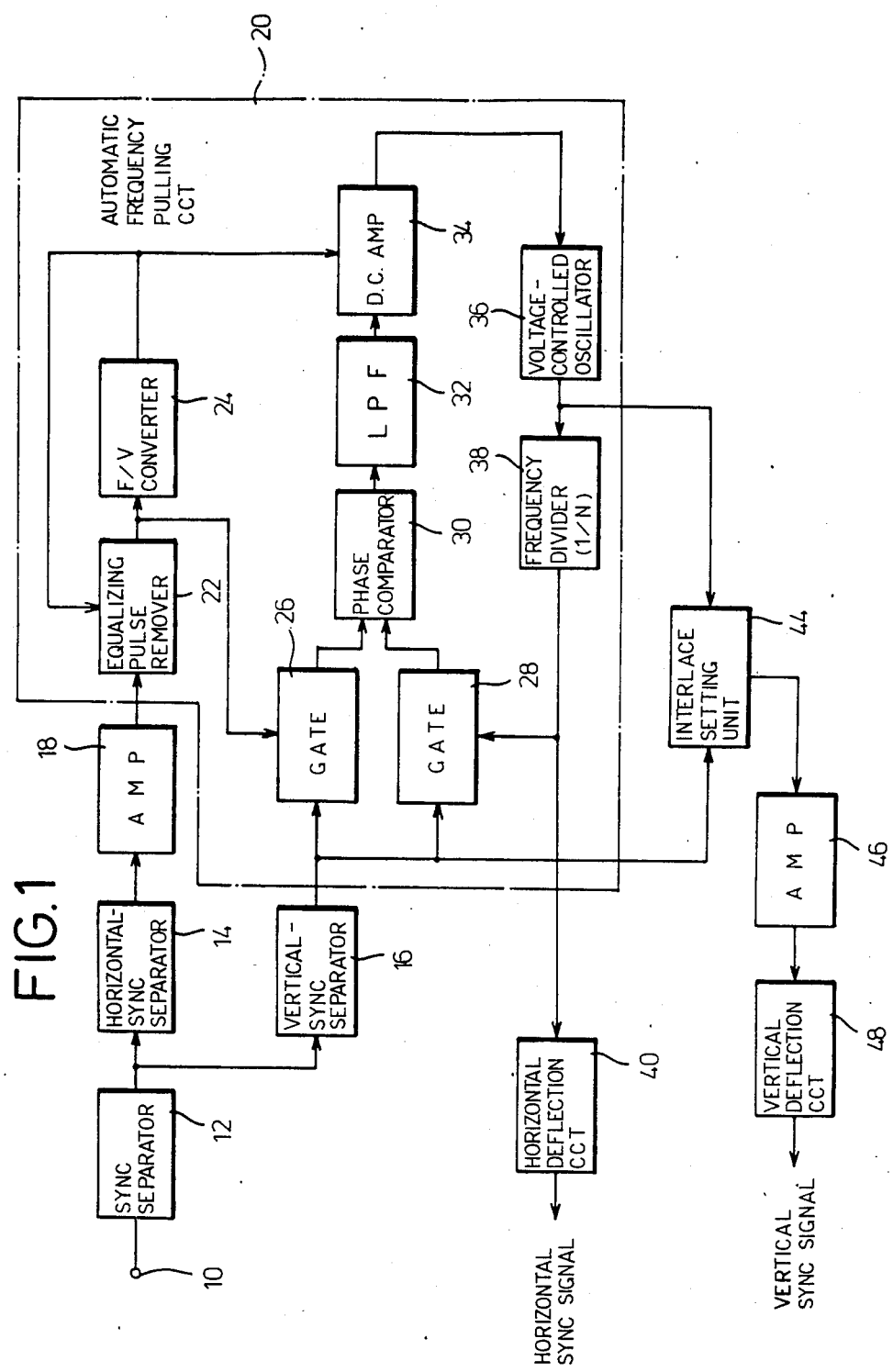
FIG. 1 is a block diagram of a scanning line position control system according to an embodiment of the present invention.

As shown in FIG. 1, a composite video signal applied to an input terminal 10 is supplied to a synchronizing signal separator 12 which separates synchronizing signals from the composite video signal. The separated synchronizing signals are then supplied to a horizontal synchronizing signal separator 16 by which a horizontal synchronizing signal is separated, and also to a vertical synchronizing signal separator 16 by which a vertical synchronizing signal is separated. The separated horizontal synchronizing signal is amplified by an amplifier 18 and fed to an automatic frequency pulling circuit 20 which generates an output having a frequency Nfh that is in phase synchronism with the horizontal synchronizing signal.

The automatic frequency pulling circuit 20 serves to alternately remove equalizing and serrated pulses to produce a synchronizing signal. More specifically, the automatic frequency pulling circuit 20 includes an equalizing pulse remover 28 comprising a monostable multivibrator which is triggered by a horizontal synchronizing signal for producing a pulse output having a pulse-to-pulse interval of ¾H, a frequency-to-voltage converter 24 for converting the frequency of the output singal from the equalizing pulse remover 22 to a voltage, a pair of gates 26, 28 controlled by the vertical synchronizing signal separated by the vertical synchronizing signal separator 16, a phase comparator 30 for comparing the phase of the output supplied from the equalizing pulse remover 22 through the gate 26 and the phase of an output supplied from a frequency divier 38 through the gate 28, a low-pass filter 32 for smoothing an output signal from the phase comparator 30, a DC amplifier 34 for amplifying an output signal from the low-pass filter 32, a voltage-controlled oscillator 36 which an output voltage from the DC amplifier 34 is applied as a control voltage, and the frequency divider 38 which divides the frequency of an output signal from the voltage-controlled oscillator 36 by N. The pulse-to-pulse duration of the pulse output from the equalizing pulse remover 22 is corrected by the output voltage from the frequency-to-voltage converter 24, and an offset voltage related to the output voltage from the frequency-to-voltage converter 24 is added to the output from the DC amplifier 34. The output from the frequency divider 38 is applied to a horizontal deflection circuit 40 of a video monitor to trigger the same. The voltage-controlled oscillator 36 has a self-running oscillation frequency set to Nfh.

Figure 2:
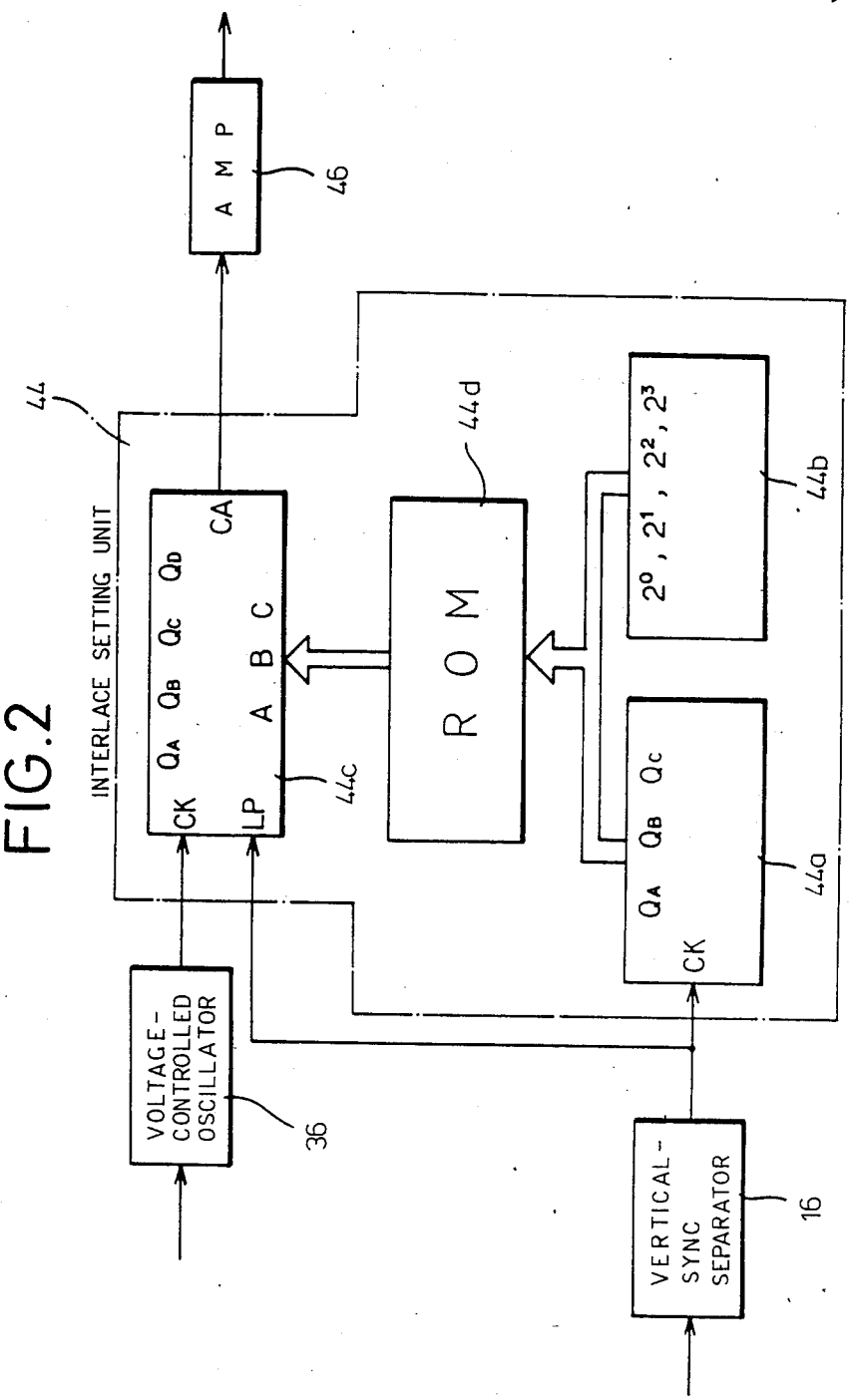
FIG. 2 is a block diagram of an interlace setting unit in the scanning line position control system of FIG. 1.

The output from the voltage-controlled oscillator 36 is supplied to an interlace setting unit 44 which shifts the leading edge of the vertical synchronizing signal by periods of 1/Nfh. An output signal from the interlace setting unit 44 is amplified by an amplifier 46 and then fed to a vertical deflection circuit of the video monitor for triggering the same.

Where seven scanning lines are to be inserted in appearance, the interlace setting unit 44 comprises, as shown in FIG. 2, a modulo-8 counter 44a for counting the vertical synchronizing signal separated by the vertical synchronizing signal separator 16, an encoder 44b for setting figures at positions $2^0$, $2^1$, $2^2$, $2^3$, a preset modulo-8 counter 44c for counting the output from the voltage-controlled oscillator 36, and a read-only memory (ROM) 44d for storing decimal data of "0" through "7", reading out preset stored data with an address given by an output from the modulo-8 counter 44a and the encoder 44b, and presetting the read-out data into the modulo-8 counter 44c.

Figure 3:
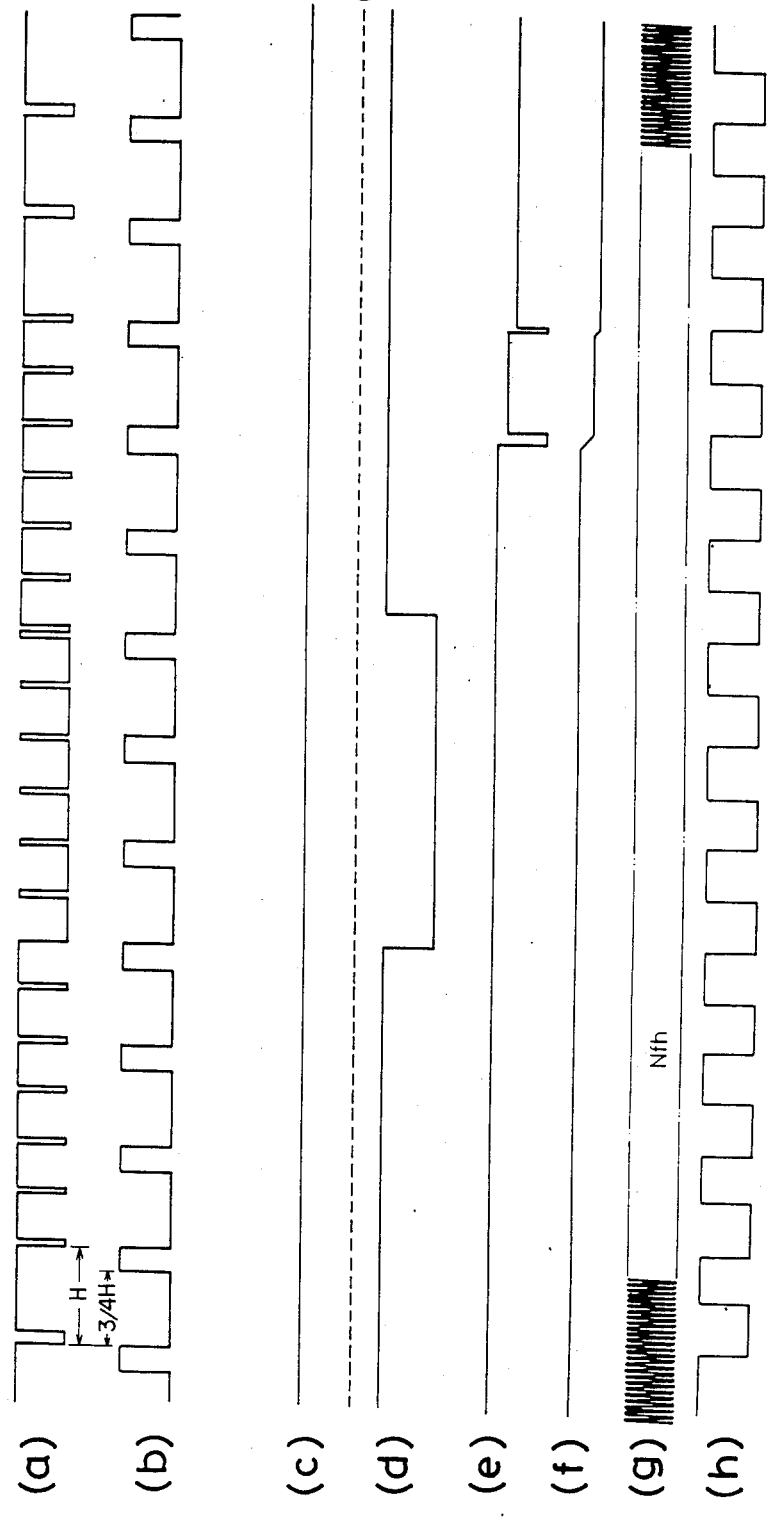
FIGS. 3 and 4 are waveform diagrams explanating operation of the scanning line position control system of FIG. 1.

Operation of the scanning line position control system thus constructed will be described below. A horizontal synchronizing signal separated by the synchronizing signal separator 12 and the horizontal synchronizing signal separator 14 is amplified by the amplifier 18. The equalizing pulse remover 22 is triggered by a negative-going edge of the horizontal synchronizing signal to produce output pulses as shown in FIG. 3(b). FIG. 3(a) illustrates synchronizing signals during an interval including a vertical blanking period in the composite video signal. As shown in FIG. 3(b), every other equalizing and serrated pulses are removed to produce periods of 1H (H is the repetitive period of the horizontal synchronizing signal). This is because the pulse-to-pulse interval of the output from the monostable multivibrator of the equalizing pulse remover 22 is selected to be ¾H. Even if the equalizing pulses and/or the serrated pulses are positionally shifted, every other equalizing and serrated pulses are removed insofar as the equalizing and serrated pulses are within a period from ½H to ¾H.

The frequency of the output signal from the equalizing pulse remover 22 is converted by the frequency-to-voltage converter 24 to a voltage as shown in FIG. 3(c). The voltage from the frequency-to-voltage converter 24 is fed back to the equalizing pulse remover 22 to control the pulse-to-pulse interval of the output from the monostable multivibrator of the equalizing pulse remover 22. Therefore, the pulse-to-pulse interval of the output from the monostable multivibrator is controlled at ¾H.

The vertical synchronizing signal separated by the vertical synchronizing signal separator 16 is as shown in FIG. 3(d). *The gates 26, 28 are open outside of the period of the vertical synchronizing signal (the period of low level in FIG. 3(d))*, for thereby allowing the phase comparator 30 to compare the phases of the outputs from the equlizing pulse remover 22 and the frequency divider 38. The output from the phase comparator 30, as shown in FIG. 3(e), is smoothed out by the low-pass filter 32, whose output is illustrated in FIG. 3(f).

The smoothed output from the low-pass filter 32 is amplified by the DC amplifier 34 to which the output voltage from the frequency-to-voltage converter 24 is applied. As a consequence, the output from the DC amplifier 34 is offset dependent on the output voltage from the frequency-to-voltage converter 24, i.e., the frequency of the input synchronizing signal. The output from the DC amplifier 34 is corrected by the output of the low-pass filter 32 from the offset voltage.

Since the output voltage from the DC amplifier 34 is applied to the voltage-controlled oscillator 36, the output frequency of the voltage-controlled oscillator 36 is also a function of the frequency of the horizontal synchronizing signal of the composite video signal applied to the input terminal 10, and is corrected by the phase difference between the inputs applied to the phase comparator 30, with the result that the output of the frequency Nfh (FIG. 3(g)) is produced from the voltage-controlled oscillator 36.

The output frequency from the voltage-controlled oscillator 36 is divided by N. Consequently, the frequency divider 38 produces a signal as shown in FIG. 3(h) which is in phase synchronism with the horizontal synchronizing signal in the composite video signal supplied to the input terminal 10. The horizontal deflection circuit 40 is triggered by the signal from the frequency divider 38. The output from the frequency divider 38 is also applied to the phase comparator 30 through the gate 28.

The output from the voltage-controlled oscillator 36 is fed to the interlace setting unit 44.

The vertical synchronizing signal separated by the vertical synchronizing signal separator 16 is counted by the modulo-8 counter 44a of the interlace setting unit 44. The ROM 44d is addressed by the count of the modulo-8 counter 44a and also by the encoding output from the encoder 44b to read out the count of the modulo-8 counter 44a and the encoding output of the encoder 44b. The data read out of the ROM 44d as the address is preset in the preset modulo-8 counter 44c in synchronism with the vertical synchronizing signal. The output from the voltage-controlled oscillator 36 is counted by the preset modulo-8 counter 44c.

Figure 4:
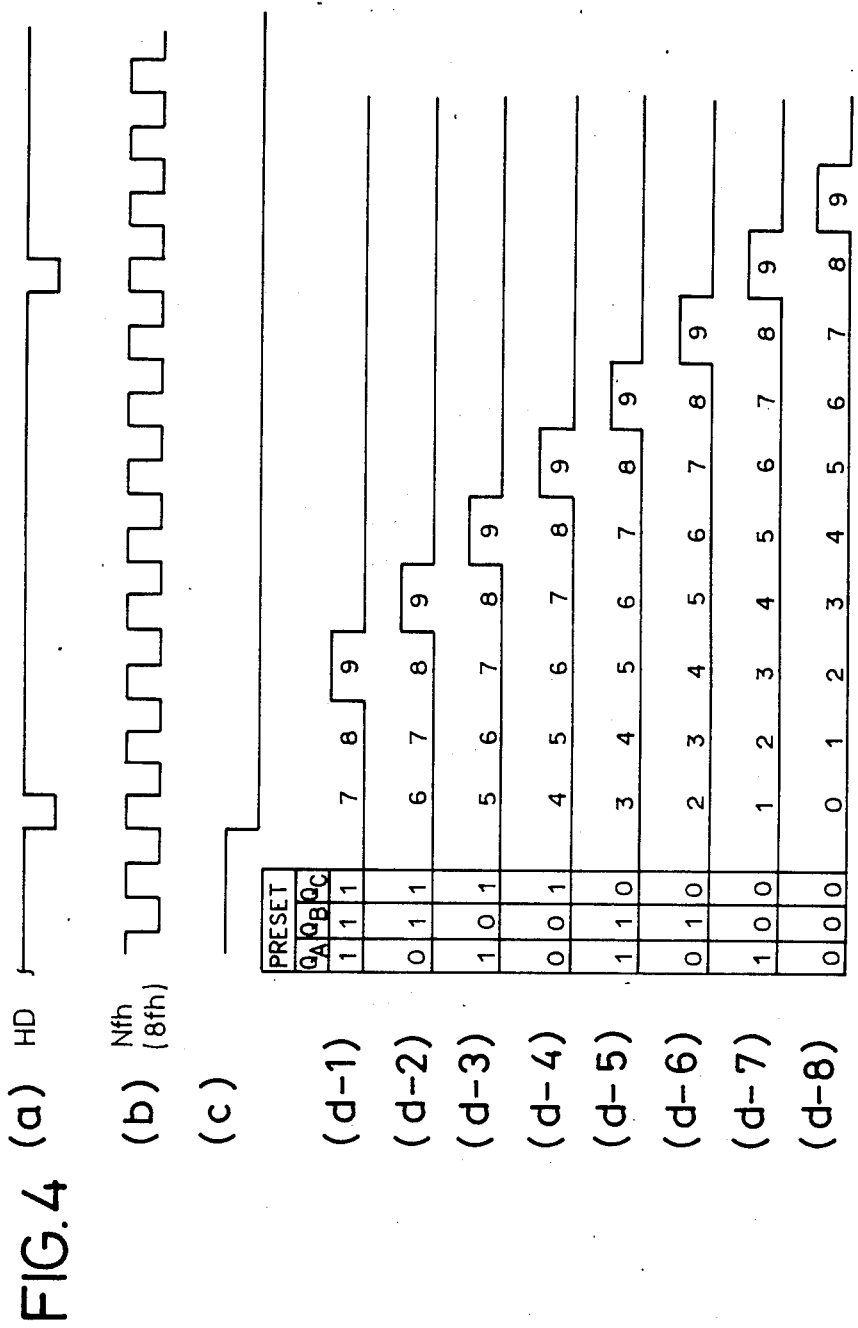

A preset value, for example "111", stored in the ROM 44d is preset in the preset modulo-8 counter 44c in synchronism with the vertical synchronizing signal. Therefore, when two pulses of a frequency 8fh are issued from the voltage-controlled oscillator 36 with reference to a leading edge of the vertical synchronizing signal, a carry signal as shown in FIG. 4(d-1) is produced from the preset modulo-8 counter 44c and amplified by the amplifier 46 to triger the vertical deflection circuit 48. FIG. 4(a) shows the horizontal synchronizing signal, FIG. 4(b) the output signal from the voltage-controlled oscillator 36, and FIG. 4(c) the vertical synchronizing signal. Denoted at 9 in FIGS. 4(d-1) through 4(d-8) are carry signals.

When a next vertical synchronizing signal is supplied, the output from the counter 44a is varied and the ROM 44d issues a preset value "110" which is preset in the preset counter 44c. Therefore, when three pulses of a frequency 8fh is produced from the voltage-controlled oscillator 36 with reference to a leading edge of the vertical synchronizing signal, a carry signal is issued as shown in FIG. 4(d-2). Thereafter, each time a vertical synchronizing signal is supplied, the preset value is decremented by "1" and the number of pulses generated by the voltage-controlled oscillator 36 is incremented by "1" until a carry output is produced. Carry outputs are thus produced as shown in FIGS. 4(d-3) through 4(d-7). As a result, the vertical synchronizing signal is shifted by periods of 1/(8fh) to insert seven scanning lines in appearance during one scanning period or one line-to-line interval.

While seven scanning lines are inserted during one scanning period in the above embodiment, the number of scanning lines that can be inserted may be changed by varying the preset value for the preset counter. The preset value can be changed by setting the encoder 44b or changing the data stored in the ROM 44d.

Figure 5:
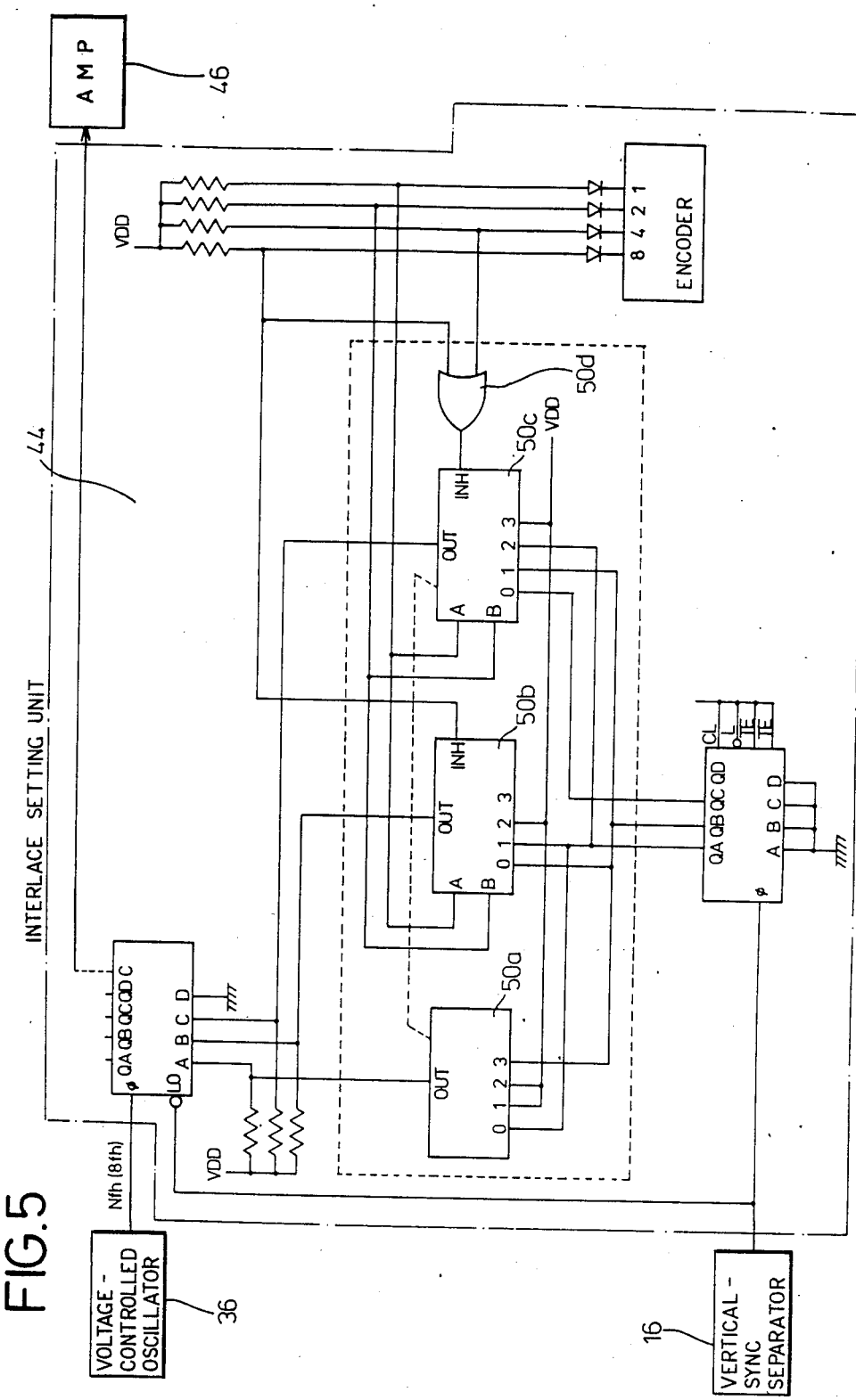
FIG. 5 is a block diagram of an interlace setting unit according to another embodiment of the present invention.

The ROM 44d may be replaced with a preset data generating means, as shown in FIG. 5, which comprises multiplexers 50a through 50c and an OR gate 50d. A scanning line position control system employing such a preset data generating means will operate in the same manner as described with reference to FIG. 4.

According to the first and second embodiments as described above, data corresponding to output data from a modulo-N counter which has counted a vertical synchronizing signal is preset in a preset modulo-N counter in synchronism with the vertical synchronizing signal, a signal of a frequency Nfh is counted by the preset modulo-N counter, and a vertical deflection circuit is triggered by a carry output from the preset modulo-N counter. Thus, the vertical synchronizing signal is shifted by periods of 1/Nfh, so that the position of the vertical synchronizing signal can be controlled. As a consequence, a maximum of (N−1) scanning lines can be inserted in appearance during one line-to-line interval for raster erasure.

Figure 6:
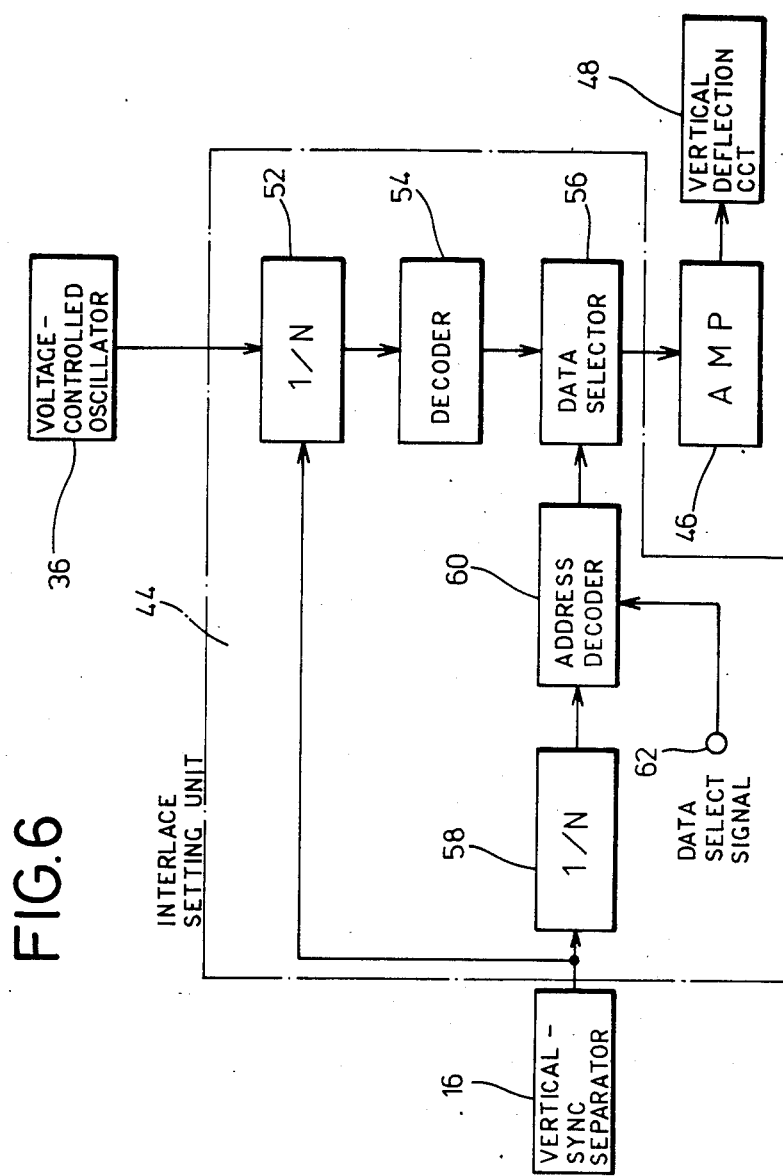
FIG. 6 is a block diagram of an interlace setting unit according to still another embodiment of the present invention.

FIG. 6 shows an interlace setting unit according to still another embodiment of the present invention. An output from a voltage-controlled oscillator 36 is supplied to a frequency divider 52 having a frequency-dividing ratio of N for dividing the frequency of the output from the voltage-controlled oscillator 36 by N.

An output from the frequency divider 52 is then fed to a decoder 54 which decodes the output of the frequency divider 52 into a train of N pulses in synchronism with the vertical synchronizing signal separated by the vertical synchronizing signal separator 16. An output from the decoder 54 is delivered to a data selector 56.

The vertical synchronizing signal separated by the vertical synchronizing signal separator 16 is supplied to a frequency divider 58 by which the frequency of the vertical synchronizing signal is divided by N. An output from the frequency divider 58 is then supplied to and decoded by an address decoder 60. The address decoder 60 is supplied with a data select signal from a data select signal terminal 62 for multiplying the input signal frequency by $2^1, 2^2, \ldots 2^K (=N)$ to decode the input signal. It is assumed that the data select signal supplied is to multiply the input signal frequency by N.

In response to output data from the address decoder 60, an input signal to the data selector 56 is selected and issued as an output signal, which is amplified by the amplifier 46 and supplied to the vertical deflection circuit 48.

Operation of the interlace setting circtui illustrated in FIG. 6 will hereinafter be described in greater detail.

To the frequency divider 52, there are applied pulses of a frequency Nfh, as shown in FIG. 7(a), which are in phase synchronism with the horizontal synchronizing signal produced by the automatic frequency pulling circuit 20. The frequency of the applied pulses is divided by N by the frequency divider 52, and the output from the frequency divider 52 is decoded by the decoder 54 into N pulses as shown in FIG. 7(b). As a result, the output from the decoder 54 has a period of h/N.

The vertical synchronizing signal from the vertical synchronizing signal separator 16 is frequency-divided by the frequency divider 58, and the frequency-divided output is applied to the address decoder 60 to enable it to produce an output as shown in FIG. 7(c). In response to the output from the address decoder 60, the data selector 56 selects the output of the decoder 54 one pulse by one pulse. Such selection of data by the data selector 56 in response to the output from the address selector 60 is schematically shown in FIG. 7(d). The output from the data selector 56 is as shown in FIG. 7(e). In this embodiment, an output pulse from the decoder 54 is selected each time the separated vertical synchronizing signal is generated. Therefore, vertical synchronizing signals which are out of phase by h/N at starting timing are reproduced and supplied to the amplifier 46. The reproduced vertical synchronizing signals are amplified by the amplifier 46 and applied to the vertical deflection circuit 48 to trigger the same for inserting (N−1) scanning lines during one line-to-line interval as shown in FIG. 7(f). A hard copy of an image formed by such inserted scanning lines is of better quality since the line-to-line interval is reduced to 1/N.

With the arrangement of the present invention, as described above, the timing at which a vertical synchronising signal is generated is shifted by h/N to insert (N−1) scanning lines, in appearance, during one line-to-line interval. Where a hard copy is produced by photographing an image formed at a reduced line-to-line interval, the hard copy has a much more uniform contrast than conventional hard copies of a higher contrast. Since the scanning line position control system of the invention is constructed of digital circuits such as a frequency divider, a ROM, a decoder, a data selector, etc., it can operate stably.

Although certain preferred embodiments have been shown and described, it should be understood that many changes and modifications may be made therein without departing from the scope of the appended claims.

What is claimed is:

1. A scanning line position control system comprising:
   signal generator means for generating a signal, having a frequency Nfh, in synronism with a horizontal synchronizing signal, having a frequency fh, separated from a composite video signal;
   a multiplex interlace setting unit receptive of the signal from said generator means and a vertical synchronizing signal separated from said composite video signal, said multiplex interlace setting unit producing an output vertical deflection signal such that the respective scanning lines, which are to be reproduced in response to said composite video signal, are vertically shifted to a plurality of positions to improve the reproduction quality of images produced using said scanning lines; and
   a vertical deflection circuit triggerable by an output signal from said multiplex interlace setting unit.

2. A scanning line position control system comprising:
   signal generator means for generating a signal having a frequency Nfh in synchronism with a horizontal synchronizing signal fh separated from a composite video signal;
   a multiplex interlace setting unit receptive of the signal from said generator means and a vertical synchronizing signal separated from said composite video signal, wherein said multiplex interlace setting unit comprises a modulo-N counter for counting the vertical synchronizing signal separated from said composite video signal, a preset modulo-N counter receptive of the signal from said signal generator means, and data generator means for generating data corresponding to output data from said modulo-N counter and for presetting said generated data into said preset modulo-N counter in synchronism with said vertical synchronizing signal, the arrangement being such that said preset modulo-N counter produces a carry signal to trigger said vertical deflection circuit; and
   a vertical deflection circuit triggerable by an output signal from said multiplex interlace setting unit.

3. A scanning line position control system according to claim 2, wherein said data generator means comprises a read-only memory.

4. A scanning line position control system according to claim 2, wherein said data generator means comprises at least one multiplexer and logic means.

5. A scanning line position control system comprising:
   signal generator means for generating a signal having a frequency Nfh in synchronism with a horizontal synchronizing signal fh separating from a composite video signal;
   a multiplex interlace setting unit receptive of the signal from said generator means and a vertical synchronizing signal separated from said composite video signal, wherein said multiplex interlace setting unit comprises decoder means for decoding a pulse signal from said signal generator means into a train of N pulses, address decoder means for generating N address data from a signal synchronous with said vertical synchronizing signal, and data selector means for selecting and issuing input pulses applied to said decoder means according to an output from said address decoder means, the arrangement being such that said data selector means issues an output to trigger said vertical deflection circuit; and
   a vertical deflection circuit triggerable by an output signal from said multiplex interlace setting unit.

* * * * *